2,816,104

METHOD OF MAKING BUTYRIC ACID ESTERS OF CELLULOSE

Carl J. Malm and Loring W. Blanchard, Jr., Rochester, N. Y., assignors to Eastman Kodak Company, Rochester, N. Y., a corporation of New Jersey No Drawing. Application November 18, 1954, Serial No. 469,834

6 Claims. (Cl. 260—227)

This invention relates to a method of procedure to be employed in the manufacture of butyric and isobutyric acid esters of cellulose using a sulfuric acid catalyst in which the cellulose is added over a period during the esterification rather than enmasse at the start of that action.

Our application Serial No. 469,833 filed of even date describes and claims a method of preparing butyric or isobutyric acid esters of cellulose in which sulfuric acid is uniformly distributed through the cellulose prior to its esterification. Application Serial No. 469,831 of Malm, Tanghe and Blanchard filed of even date describes and claims a method of preparing cellulose for esterification with butyric anhydride or isobutyric anhydride in which sulfuric acid catalyst is uniformly distributed in an activated cellulose by means of an acetic acid solution of sulfuric acid. In both of those procedures the sulfuric acid catalyst is uniformly distributed throughout the cellulose. U. S. Patent 2,487,892 of Richter and MacClaren describes a method of making cellulose esters in which sulfuric acid is uniformly distributed throughout the cellulose before the cellulose is added to the esterification bath.

We have noted that in the manufacture of butyric or isobutyric acid esters of cellulose in which butyric anhydride or isobutyric anhydride is employed as the esterifying agent for the cellulose when cellulose containing sulfuric acid catalyst is added to the esterification mixer containing the anhydride a sudden rise in temperature occurs due to the reaction between (1) the water remaining in the cellulose and the anhydride, (2) the sulfuric acid and the anhydride and (3) the resulting acyl sulfuric acid and the cellulose. This temperature rise is excessive in carrying out esterification procedures on a large scale which results in breakdown of the cellulose or other derogatory effect thereon.

One object of our invention is to provide a procedure for esterifying cellulose with butyric anhydride or isobutyric anhydride in which breakdown of the cellulose is avoided. Another object of our invention is to provide a method for preparing cellulose butyrates or cellulose isobutyrates in which sulfuric acid catalysts may be safely employed with the more sluggish butyric and isobutyric anhydrides. Other objects of our invention will appear herein.

We have found that a cellulose through which sulfuric acid has been uniformly distributed may be safely esterified with a sluggish anhydride such as isobutyric anhydride if the cellulose is added to the esterification mass over an extended period of time thereby avoiding excessive temperature rise. The addition of the cellulose over a period of 10-45 minutes instead of all at once at the beginning of the esterification avoids any detrimental effect on the cellulose by the sulfuric acid because of increase of temperature before protective acyl groups are taken on by the cellulose in sufficient amount to prevent its breaking down. The cellulose may be added to the esterification mixer either in portions over a period on the order of ½ hour or it may be added to the esterification mixer continuously over that period. We have found that using in normal equipment cellulose in which an amount of sulfuric acid on the order of 5% is mixed in the fibers, ½ hours is usually sufficient for the addition of the cellulose to the esterification mixer to avoid cellulose breakdown. However, various factors are to be taken into account in determining the rate at which the cellulose is added such as the efficiency of the cooling system of the esterification mixer, the temperature of the cooling water which is employed in connection therewith and whether or not a product of high or low viscosity is desired. If a low viscosity product is wanted, some breakdown of the cellulose is not objectionable. By operating in accordance with our invention even though large scale equipment is employed the maximum temperature reached in the esterification mass need not be greater than 100–110° F. and may in some cases even be held down to a maximum of not more than 80° F. to obtain a product of good viscosity.

The following examples illustrate our invention:

Example 1

3.7 lbs. of cotton linters were soaked for 5 minutes in 74 lbs. of aqueous sulfuric acid having a concentration of 10% and a temperature of 60° F. The excess liquid was centrifuged off and the water was extracted from the linters by means of 5 changes of a mixture of 75% isobutyric acid and 25% acetic acid at 60° F., centrifuging after each treatment. After the last centrifuging a cellulose cake was obtained consisting of 10% acetic acid, 30% isobutyric acid, 2.7% water, 3.1% sulfuric acid and 54.2% cellulose. The sulfuric acid-containing cellulose thus obtained was divided into 4 equal parts and was added to a Werner-Pfleiderer mixer containing 14.8 lbs. of isobutyric anhydride at equal intervals over a period of ½ hour such as initially, after 10 minutes, after 20 minutes and after 30 minutes. The esterification was allowed to proceed so that a maximum temperature of 80° F. was reached and the mass was maintained at that temperature until a clear fiber-free solution of cellulose acetate isobutyrate was obtained, the ester containing approximately 40% of isobutyryl.

Example 2

3.7 lbs. of cotton linters were soaked in 74 lbs. of aqueous sulfuric acid of 2.5% concentration at 60° F. for 5 minutes. The excess sulfuric acid was centrifuged off and the water on the linters was extracted therefrom by centrifuging with 5 changes of isobutyric acid having a temperature of 60° F. The cellulose retained substantially all of the sulfuric acid imparted thereto by the water solution. After the final extraction a cellulose cake was obtained consisting of 1% sulfuric acid, 4% water, 38% isobutyric acid and 57% of cellulose. The cellulose was comminuted and was added to a jacketed Werner-Pfleiderer mixer slowly and uniformly over a period of 15 minutes which mixer contained 14.8 lbs. of isobutyric anhydride. The esterification was allowed to proceed to a maximum temperature of 100° F. A clear solution of cellulose isobutyrate was obtained.

The cellulose esters obtained in accordance with our invention are characterized by good viscosity properties and are useful for the preparation of various types of cellulose ester products such as plastics, or molding compositions, sheeting, protective coatings and the like.

We claim:

1. In a process for preparing cellulose esters by esterifying cellulose in an esterification bath containing as the predominating esterification reagent the anhydride of a fatty acid of 4 carbon atoms, the procedure which comprises keeping the temperature of the esterification mass at a maximum of no more than 100° F. by adding thereto, over a period of at least 10 minutes and not more than 45 minutes, the cellulose to be esterified which cellulose contains sulfuric acid esterification catalyst uniformly distributed therethrough.

2. In a process for preparing cellulose esters by esterifying cellulose in an esterification bath containing as the predominating esterification reagent the anhydride of a fatty acid of 4 carbon atoms, the procedure which comprises keeping the temperature of the esterification mass at a maximum of no more than 100° F. by adding thereto, over a period of ½ hour, the cellulose to be esterified which cellulose contains sulfuric acid esterification catalyst uniformly distributed therethrough.

3. In a process for preparing cellulose esters by esterifying cellulose in an esterification bath containing as the predominating esterification reagent the anhydride of a fatty acid of 4 carbon atoms, the procedure which comprises keeping the temperature of the esterification mass at a maximum of no more than 100° F. by adding intermittently thereto, over a period of at least 10 minutes and not more than 45 minutes, the cellulose to be esterified which cellulose contains sulfuric acid esterification catalyst which has been uniformly distributed therethrough.

4. In a process for preparing cellulose esters by esterifying cellulose in an esterification bath containing as the predominating esterification reagent the anhydride of a fatty acid of 4 carbon atoms, the procedure which comprises keeping the temperature of the esterification mass at a maximum of no more than 100° F. by adding in a continuous manner thereto, over a period of at least 10 minutes and not more than 45 minutes, the cellulose to be esterified which cellulose contains sulfuric acid esterification catalyst which has been uniformly distributed therethrough.

5. In a process for preparing isobutyric acid esters of cellulose by esterifying cellulose in an esterification bath containing as the predominating esterification reagent isobutyric anhydride, the procedure which comprises keeping the temperature of the esterification mass at a maximum of no more than 100° F. by adding thereto, over a period of at least 10 minutes and not more than 45 minutes, the cellulose to be esterified which cellulose contains sulfuric acid esterification catalyst uniformly distributed therethrough.

6. In a process for preparing isobutyric acid esters of cellulose by esterifying cellulose in an esterification bath containing as the predominating esterification reagent isobutyric anhydride, the procedure which comprises keeping the temperature of the esterification mass at a maximum of no more than 100° F. by adding thereto, over a period of ½ hour, the cellulose to be esterified which cellulose contains sulfuric acid esterification catalyst which has been uniformly distributed therethrough.

References Cited in the file of this patent

UNITED STATES PATENTS

| | | |
|---|---|---|
| 2,261,237 | Dreyfus | Nov. 4, 1941 |
| 2,342,416 | Malm | Feb. 22, 1944 |
| 2,487,892 | Richter et al. | Nov. 15, 1949 |
| 2,526,761 | Milbrada | Oct. 24, 1950 |
| 2,622,080 | Richter et al. | Dec. 16, 1952 |